United States Patent
Kim et al.

(10) Patent No.: US 11,353,330 B2
(45) Date of Patent: Jun. 7, 2022

(54) VEHICLE TERMINAL AND CONTROL METHOD THEREOF

(71) Applicants: Hyundai Motor Company, Seoul (KR); Kia Motors Corporation, Seoul (KR)

(72) Inventors: Sung Un Kim, Gyeonggi-do (KR); Cheon Maeng, Gyeonggi-do (KR); Young Ki Kim, Gyeonggi-do (KR); Jae Yong Lee, Chungcheongbukdo (KR); Sung Jin Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 295 days.

(21) Appl. No.: 16/518,158

(22) Filed: Jul. 22, 2019

(65) Prior Publication Data

US 2020/0271471 A1 Aug. 27, 2020

(30) Foreign Application Priority Data

Feb. 22, 2019 (KR) ........................ 10-2019-0021317

(51) Int. Cl.
 *G01C 21/34* (2006.01)
 *B60L 58/12* (2019.01)
 *B60L 50/50* (2019.01)
 *G01C 21/36* (2006.01)

(52) U.S. Cl.
 CPC .......... *G01C 21/3469* (2013.01); *B60L 50/50* (2019.02); *B60L 58/12* (2019.02); *G01C 21/3667* (2013.01); *G01C 21/3685* (2013.01); *B60L 2200/24* (2013.01); *B60L 2240/622* (2013.01); *B60L 2250/16* (2013.01)

(58) Field of Classification Search
 CPC ............ G01C 21/3469; G01C 21/3685; G01C 21/3667; B60L 50/50; B60L 58/12; B60L 2200/24
 See application file for complete search history.

(56) References Cited

U.S. PATENT DOCUMENTS

| | | | | |
|---|---|---|---|---|
| 6,037,746 | A * | 3/2000 | Sheng ..................... | B60L 50/66 320/104 |
| 9,397,518 | B1 * | 7/2016 | Theobald ................. | B25J 5/007 |
| 9,658,076 | B2 * | 5/2017 | Aich ....................... | B60L 58/12 |
| 9,969,288 | B2 * | 5/2018 | Ikeda ....................... | B60L 53/63 |
| 9,970,778 | B2 * | 5/2018 | Aich .................. | G01C 21/3423 |
| 10,112,620 | B2 * | 10/2018 | Matsumoto ........ | G01C 21/3469 |

(Continued)

FOREIGN PATENT DOCUMENTS

| | | | | |
|---|---|---|---|---|
| DE | 102018129779 A1 * | 5/2019 | ................ | H02J 7/00 |
| KR | 20180047673 A | 5/2018 | | |

*Primary Examiner* — Luis A Martinez Borrero

(74) *Attorney, Agent, or Firm* — Fox Rothschild LLP

(57) ABSTRACT

A vehicle terminal may include: a communicator configured to perform communication with a personal mobility device; a processor configured to estimate a state of charge of a battery of the personal mobility device when a vehicle arrives at a set location based on whether the battery is being charged and to determine a travelable area of the personal mobility device based on the state of charge of the battery; and a display device operatively coupled to the processor, the display device configured to display the travelable area.

20 Claims, 7 Drawing Sheets

(56) References Cited

U.S. PATENT DOCUMENTS

| | | | | |
|---|---|---|---|---|
| 10,157,242 | B2* | 12/2018 | Fukubayashi | B60L 3/12 |
| 10,232,855 | B2* | 3/2019 | Matsumoto | G09B 29/10 |
| 10,315,584 | B2* | 6/2019 | Kuhlbach | B60R 9/10 |
| 10,345,115 | B2* | 7/2019 | Seok | G01C 21/3492 |
| 10,522,035 | B2* | 12/2019 | Zhang | G08G 1/096805 |
| 10,578,676 | B2* | 3/2020 | Neubecker | H02J 7/0047 |
| 2012/0112696 | A1* | 5/2012 | Ikeda | H02J 7/007 |
| | | | | 320/109 |
| 2014/0163854 | A1* | 6/2014 | Matsumoto | G01C 21/3469 |
| | | | | 701/123 |
| 2016/0097650 | A1* | 4/2016 | Aich | B60L 58/12 |
| | | | | 701/527 |
| 2016/0200394 | A1* | 7/2016 | Toya | B60L 15/08 |
| | | | | 180/167 |
| 2016/0311334 | A1* | 10/2016 | Moravick | B60L 58/12 |
| 2017/0144673 | A1* | 5/2017 | Matsumoto | B60W 20/12 |
| 2017/0219366 | A1* | 8/2017 | Aich | G01C 21/3423 |
| 2018/0082585 | A1* | 3/2018 | Zhang | G08G 1/096883 |
| 2018/0120123 | A1* | 5/2018 | Seok | G01C 21/3661 |
| 2019/0162792 | A1* | 5/2019 | Neubecker | G01R 31/387 |
| 2019/0178663 | A1* | 6/2019 | Mukai | G01C 21/3469 |
| 2020/0111268 | A1* | 4/2020 | Montague | G01C 21/3697 |
| 2020/0185929 | A1* | 6/2020 | Cooper | H02J 13/00032 |
| 2020/0400446 | A1* | 12/2020 | Beaurepaire | G01C 21/3492 |
| 2021/0004848 | A1* | 1/2021 | Nakajima | B60L 53/80 |

\* cited by examiner

VEHICLE TERMINAL AND CONTROL METHOD THEREOF

CROSS-REFERENCE TO RELATED APPLICATION

This application claims the benefit of priority to Korean Patent Application No. 10-2019-0021317, filed in the Korean Intellectual Property Office on Feb. 22, 2019, the entire contents of which are incorporated herein by reference.

TECHNICAL FIELD

The present disclosure relates to a vehicle terminal and a control method thereof.

BACKGROUND

The term "personal mobility device" can refer, typically, to an electrically-powered personal moving means, such as an electric scooter, electric kickboard, electric skateboard, electric bicycle, and the like. Such personal mobility devices often (but not always) use electric energy as power and therefore, produce no pollution. Moreover, these devices occupy minimal space, making for a convenient transportation option.

In particular, personal mobility devices have been proposed as a way to solve traffic problems. Thus, a vehicle provided with a personal mobility device has been introduced. For example, a user can search for a facility (e.g., a parking lot) in which parking is possible nearby a destination, park the vehicle in the facility, and then use the personal mobility device to travel from the facility to the destination.

However, conventionally, a parking facility nearby the destination has been searched for without consideration of a state of charge of a battery of a personal mobility device. Consequently, the user may have to manually carry the personal mobility device in the event that the device's battery is uncharged.

SUMMARY

The present disclosure has been made to solve the above-mentioned problems occurring in the related art while advantages achieved by the prior art are maintained intact.

An aspect of the present disclosure provides a vehicle terminal and a control method thereof which predict a state of charge (SOC) of a battery of a personal mobility device coupled with a vehicle when the vehicle arrives at a set location and display a range in which the vehicle is capable of moving using the personal mobility device.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, a vehicle terminal may include: a communicator configured to perform communication with a personal mobility device; a processor configured to estimate a state of charge of a battery of the personal mobility device when a vehicle arrives at a set location based on whether the battery is being charged and to determine a travelable area of the personal mobility device based on the state of charge of the battery; and a display device operatively coupled to the processor, the display device configured to display the travelable area.

When the battery is being charged, the processor may be configured to compute the state of charge of the battery based on a current state of charge of the battery, a charge rate of the battery, and a charge time of the battery.

When the battery is not being charged, the processor may be configured to identify a current state of charge of the battery through the communicator and to determine that the current state of charge of the battery is the state of charge of the battery.

The set location may be defined as a preset destination or a current position of the vehicle.

The processor may be configured to compute a travelable distance of the personal mobility device based on the estimated state of charge of the battery and to calculate a radius of the travelable area by multiplying the travelable distance by a set ratio.

When the set location is the preset destination, the processor may be configured to compute the travelable area with the preset destination as a start point based on the radius of the travelable area.

When the set location is the current position of the vehicle, the processor may be configured to compute the travelable area with the current position of the vehicle as a start point based on the radius of the travelable area.

The processor may be configured to adjust the set ratio according to a user input.

The display device may be configured to display the set location on a map and the travelable area with the set location as a start point.

The processor may be configured to search for and identify a parking lot in the travelable area, and the display device may be configured to display the identified parking lot together with the travelable area.

Furthermore, according to embodiments of the present disclosure, a control method of a vehicle terminal may include: determining, by a processor, whether a battery of a personal mobility device is being charged; estimating, by the processor, a state of charge of the battery when a vehicle arrives at a set location based on whether the battery is being charged; determining, by the processor, a travelable area of the personal mobility device based on the state of charge of the battery; and displaying, by a display device operatively coupled to the processor, the travelable area.

The estimating of the state of charge of the battery may include, when the battery is being charged, computing, by the processor, the state of charge of the battery based on a current state of charge of the battery, a charge rate of the battery, and a charge time of the battery.

The estimating of the state of charge of the battery may include, when the battery is not being charged: identifying, by the processor, a current state of charge of the battery through communication with the personal mobility device; and determining, by the processor, that the current state of charge of the battery as the state of charge of the battery.

The set location may be defined as a preset destination or a current position of the vehicle.

The determining of the travelable area may include computing, by the processor, a travelable distance of the personal mobility device based on the state of charge of the battery, and computing, by the processor, the travelable area with the preset destination as a start point based on the travelable distance.

The determining of the travelable area may include computing, by the processor, a travelable distance of the personal mobility device based on the estimated state of charge of the battery, and computing, by the processor, the travelable area with the current position of the vehicle as a start point based on the travelable distance.

The determining of the travelable area may include calculating, by the processor, a radius of the travelable area by multiplying the travelable distance by a set ratio and computing, by the processor, the travelable area with the set location as a start point based on the radius of the travelable area.

The displaying of the travelable area may include displaying, by the display device, the set location on a map and the travelable area with the set location as a start point.

The control method may further include searching for and identifying, by the processor, a parking lot in the travelable area after the computing of the travelable area.

The displaying of the computed travelable area may include displaying, by the display device, the travelable area together with the identified parking lot.

BRIEF DESCRIPTION OF THE DRAWINGS

The above and other objects, features and advantages of the present disclosure will be more apparent from the following detailed description taken in conjunction with the accompanying drawings.

Figure 1:
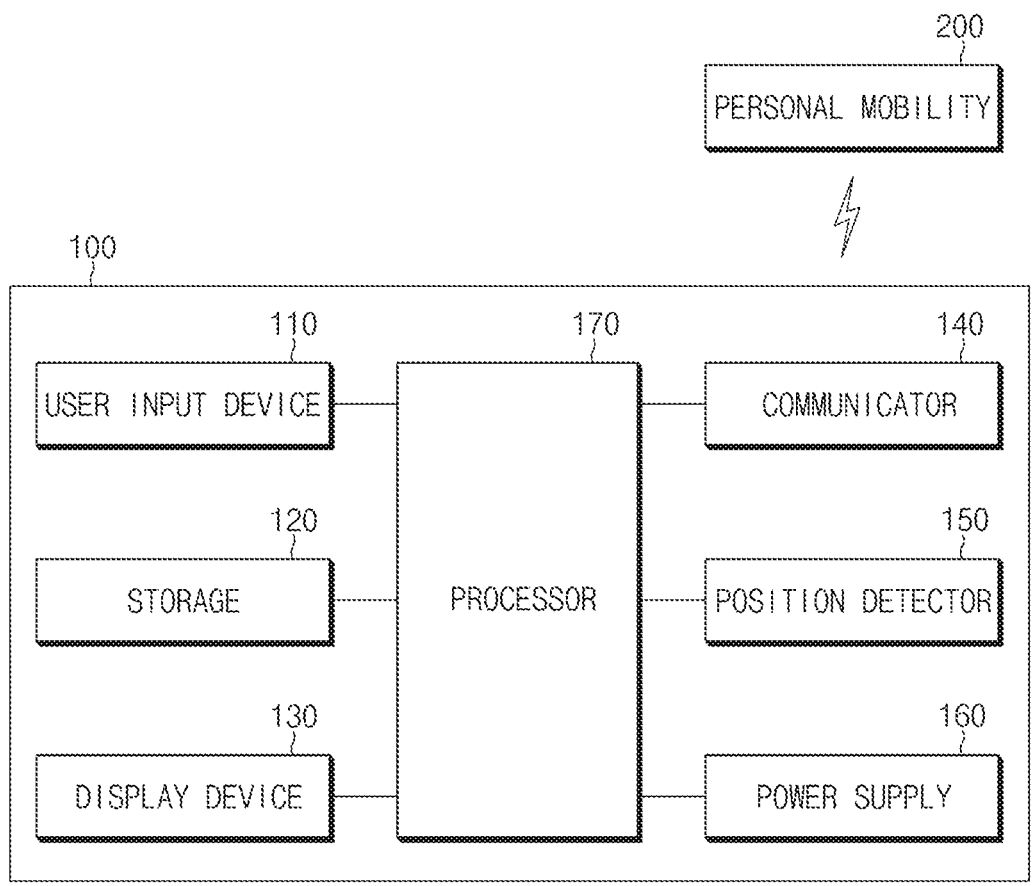
FIG. 1 is a block diagram illustrating a vehicle terminal according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, an object of the present disclosure is to improve efficiency in use of a vehicle in combination with a personal mobility device to provide flexible mobility. Another object is to provide technology for calculating mobility (i.e., moving capability) of a personal mobility device, that is, a travelable area (i.e., a travelable range), and providing the same to a user prior to arriving at a destination.

FIG. 1 is a block diagram illustrating a vehicle terminal 100 according to embodiments of the present disclosure.

The vehicle terminal 100 may be implemented with, for example, a navigation terminal, a telematics terminal, an AVN (Audio-Video-Navigation) which is installed in a vehicle to provide route guidance. The vehicle terminal 100 may include a user input device 110, storage 120, a display device 130, a communicator 140, a position detector 150, a power supply 160, and a processor 170.

The user input device 110 may generate data according to a user's operation. For example, the user input device 110 may output destination information according to a user input. The user input device 110 may be implemented with, for example, a keyboard, a keypad, a button, a switch, a touch pad, and/or a touch screen.

The storage 120 may store a program for operation of the processor 170, and temporarily store input/output data. The storage 120 may store map data, settings information, and the like, and may store a route search algorithm, a route generation algorithm, and the like.

The storage 120 may be implemented with at least one or more storage medium (recording medium) of storage media such as a flash memory, a hard disk, an SD card (Secure Digital Card), a random access memory (RAM), a static random access memory (SRAM), a Read Only Memory (ROM), a Programmable Read Only Memory (PROM), an Electrically Erasable and Programmable ROM (EEPROM), an Erasable and Programmable ROM (EPROM), a register, a removable disk and a web storage.

The display device 130 may output a progress status and/or result of operation of the processor 170 and output map data, that is, a map. The display device 130 may display a travel route, a destination, a current position of a vehicle, and/or state information of a personal mobility device 200 and a travelable area, on a map.

The display device 130 may include at least one or more of a liquid crystal display (LCD), a thin film transistor liquid crystal display (TFT LCD), an organic light-emitting diode (OLED) display, a flexible display, a 3D display, a transparent display, a head-up display (HUD), a touch screen, and a cluster.

The display device 130 may include an audio output device such as a speaker capable of outputting audio data. For example, the display device 130 may display route guidance information and output a speech signal (audio signal) through the speaker.

In addition, the display device 130 may be implemented with a touch screen coupled with a touch sensor, and may be used as an input device as well as an output device. As the touch sensor, a touch film or a touch pad may be used.

The communicator 140 may be a communication device for performing wireless and/or wired communication with the personal mobility device 200. The communicator 140 may receive a state of charge and/or charge status information transmitted from the personal mobility device 200.

As the wireless communication technology, there may be used, wireless Internet technology such as WLAN (WiFi), Wibro (Wireless broadband) and Wimax (World Interoperability for Microwave Access), and short range communication technology such as Bluetooth, Near Field Communication (NFC), Radio Frequency identification (RFID), infrared data association (IrDA), and ZigBee. A Universal Serial Bus (USB) or the like may be used as the wired communication technology.

The position detector 150 may measure the current position of the vehicle (current vehicle position). The position detector 150 may measure the vehicle position using at least one of positioning techniques such as Global Positioning System (GPS), Dead Reckoning (DR), Differential GPS (DGPS), and Carrier Phase Differential GPS (CDGPS).

The power supply 160 may supply charge power required to charge a battery 220 of the personal mobility device 200, which will be described later. The power supply 160 may be connected to the personal mobility device 200 in a wired or wireless manner, and may support wireless charging or wired charging. The power supply 160 may be implemented with an inverter that converts direct current (DC) power output from a battery (vehicle battery) mounted in the vehicle into alternating current (AC) power and outputs the same.

The processor 170 may control overall operation of the vehicle terminal 100. The processor 170 may include at least one of an application specific integrated circuit (ASIC), a digital signal processor (DSP), a programmable logic device (PLD), field programmable gate array (FPGAs), a central processing unit (CPU), microcontrollers, and microprocessors.

The processor 170 may set a destination based on a user input inputted through the user input device 110. The processor 170 may search for routes for reaching the destination from a departure location, for example, the current position of the vehicle, select one of the found routes, and perform route guidance.

The processor 170 may identify the state of charge and charge status of the personal mobility device 200 when the destination is set and before the vehicle starts traveling. In the disclosure, the State Of Charge (SOC) may be a charge amount, that is, the remaining battery capacity of the battery 220 mounted on the personal mobility device 200, and the charge status may be classified into a being-charged status, a fully charged status, and an error (failure) status.

The processor 170 may identify the charge status of the personal mobility device 200 based on charge status information transmitted from the personal mobility device 200 or whether the power supply 160 and the personal mobility device 200 are connected. That is, the processor 170 may determine whether the personal mobility device 200 is being charged.

The processor 170 may acquire the current charge status information from the personal mobility device 200 through the communicator 140 when the personal mobility device 200 is not being charged. The processor 170 may determine the state of charge of the personal mobility device 200 as a current state of charge when the vehicle arrives at (reaches) the destination of the vehicle.

The processor 170 may acquire a charge rate and current charge status information of the personal mobility device 200 through the communicator 140 when the personal mobility device 200 is being charged. The processor 170 may calculate a charge time of the personal mobility device 200 based on a time required to arrive at the destination from the departure location. The processor 170 may estimate the state of charge of the personal mobility device 200 at the time when the vehicle arrives at the destination in consideration of the current state of charge, the charge rate, and the charge time of the personal mobility device 200. The time required to arrive at the destination (a set location), that is, a destination arrival time is a time computed by the processor 170 considering a distance from the current position of the vehicle to the destination and traffic information. When the charging of the personal mobility device 200 is performed from the starting of the vehicle, the destination arrival time may be regarded as the charge time. When the charging of the personal mobility device 200 is started in the middle of traveling of the vehicle, a time calculated by subtracting a vehicle traveling time until the charging of the personal mobility device 200 is started from the destination arrival time may be regarded as the charge time. The charge rate may refer to the amount of charge of the battery per hour that is detected by a battery management device 230 of the personal mobility device 200. However, when the battery management device 230 is not allowed to inform the vehicle of the charge rate of the personal mobility device 200 due to communication error or the like, the processor 170 may figure out the charge rate based on voltage/current amount information of a charge terminal which is able to be connected to the personal mobility device 200. In addition, when it is hard to figure out the current state of charge of the personal mobility device 200 due to communication failure, the processor 170 may set the state of charge to "0".

The processor 170 may calculate (compute) a travelable distance of the personal mobility device 200 based on the estimated state of charge of the personal mobility device 200. The processor 170 may determine a travelable area based on the travelable distance. The processor 170 may calculate (compute) the travelable area with the destination as a start point based on the travelable distance. In this case, the processor 170 may calculate a radius of the travelable area by multiplying the travelable distance by a set ratio. For example, when the travelable distance is 10 km and the set ratio is 50%, the processor 170 may calculates a radius of the travelable area 5 km by multiplying the travelable distance 10 km by the set ratio 0.5. Here, the set ratio may be adjusted according to a user input. That is, the processor 170 may adjust the setting ratio based on the data input from the user input device 110.

The processor 170 may output the determined travelable area to the display device 130. The processor 170 may display the travelable area on a map displayed on the display device 130. In this case, the processor 170 may display the destination on the map and also display the travelable area with the destination as a start point.

On the other hand, the processor 170 may identify the current position of the vehicle through the position detector 150 in real time when traveling of the vehicle is started in a state in which a destination is not set. In addition, the processor 170 may determine whether the personal mobility device 200 is being charged.

The processor 170 may compute the state of charge of the personal mobility device 200 in real time when the personal mobility device 200 is being charged. In this case, the processor 170 may compute the state of charge of a battery based on the current state of charge, the charge rate, and the charge time of the personal mobility device 200. The charge time may be a time counted based on the time when the personal mobility device 200 starts charging.

The processor 170 may identify the current state of charge of the personal mobility device 200 when the personal mobility device 200 is not being charged.

The processor 170 may compute a travelable distance of the personal mobility device 200 using the state of charge of the battery computed in real time or the current state of charge information of the battery. The processor 170 may determine the travelable area of the personal mobility device 200 with the current position of the vehicle as a start point based on the travelable distance. The processor 170 may calculate the radius of the travelable area by multiplying the travelable distance by the set ratio.

The processor 170 may output the travelable area of the personal mobility device 200 to the display device 130 by reflecting the calculated radius of the travelable area. In this case, the processor 170 may display the current position of the vehicle on the map displayed on the display device 130, and simultaneously display the travelable area with the current position of the vehicle as a start point.

The processor 170 may search for parking lots in the travelable area and display the found parking lots. When any one of the displayed parking lots is selected by the user, the processor 170 may change the destination to the selected parking lot and perform route search. The processor 170 may recalculate the travelable area based on the changed destination when the destination is changed.

Although the processor 170 is described as calculating the travelable area by applying the set ratio to the travelable distance in the above-described embodiments, the processor 170 may calculate the travelable area of the personal mobility device 200 in consideration of transportation means (e.g., personal mobility, walking and/or public transportation) to be used by the user along with the vehicle. For example, when the user selects personal mobility and walking as transportation means to be used by the user along with the vehicle, the travelable area of the personal mobility device 200 may be extended to cope with the case of using only the personal mobility together with the vehicle.

In addition, the processor 170 may calculate the travelable area of the personal mobility device 200 based on the current state of charge of the battery 220 when the battery 220 of the personal mobility device 200 is in a fully charged status.

Figure 2:
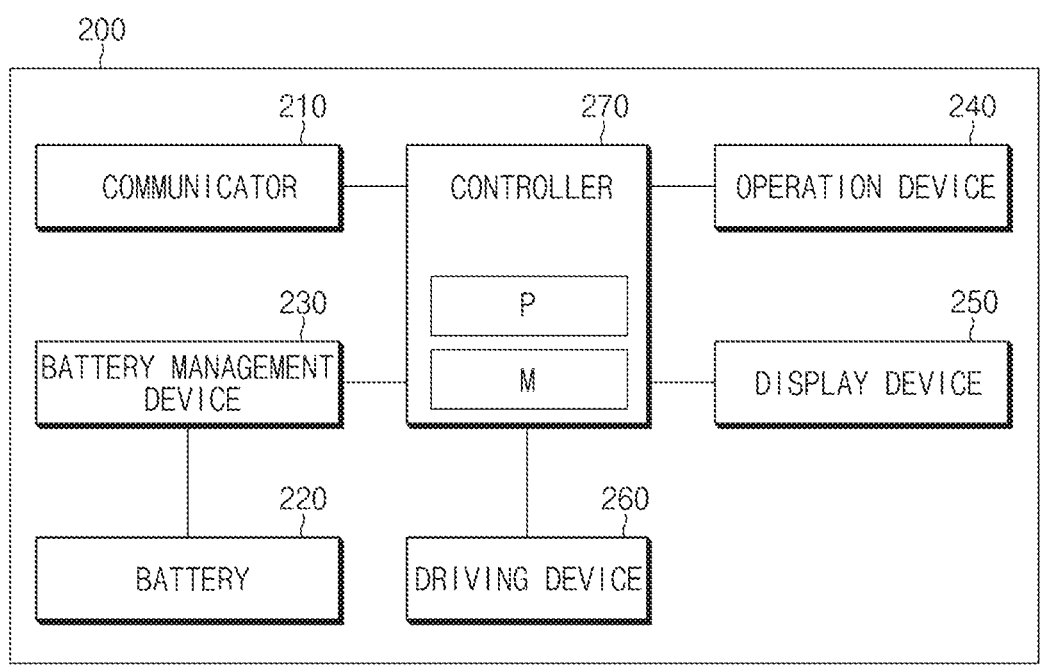
FIG. 2 is a block diagram of a personal mobility device according to embodiments of the present disclosure.

FIG. 2 is a block diagram of personal mobility according to embodiments of the present disclosure.

As shown in FIG. 2, the personal mobility device 200 may include a communicator 210, the battery 220, the battery management device 230, an operation device 240, a display device 250, a driving device 260, and a controller 270. The personal mobility device 200 may be accommodated in a space provided in the vehicle.

The communicator 210 may perform wireless and/or wired communication with the vehicle terminal 100. The communicator 210 may transmit information on a state of charge (a current state of charge) and/or a charge status (e.g., a being-charged status or a not-being-charged status) of the battery 220 or the like according to an instruction from the controller 270. As wireless communication technology, there may be used, wireless Internet technology such as WLAN (WiFi), Wibro (Wireless broadband) and Wimax (World Interoperability for Microwave Access), and short range communication technology such as Bluetooth, Near Field Communication (NFC), Radio Frequency identification (RFID), infrared Data Association (IrDA), and ZigBee. A Universal Serial Bus (USB) or the like may be used as the wired communication technology.

The battery 220 may supply power necessary for driving the personal mobility device 200. The battery 220 may include a plurality of battery cells.

The battery management device 230 may be a battery management system (BMS) that monitors a state of charge (charge amount), a charge status (e.g., a being-charged status, a fully charged status, and a failure status), a state of health (SOH), temperature and/or voltage, or the like. The battery management device 230 may charge the battery 220 with power supplied from the power supply 160 provided in the vehicle. The battery management device 230 may discharge the power stored in the battery 220 to the driving device 260 under the control of the controller 270. The battery management device 230 may include an overcharge prevention circuit and an over discharge prevention circuit.

The operation device 240, which is for inputting a command for controlling operation of the personal mobility device 200, may be implemented with a switch, a button, a touch pad, a touch screen, or the like. The operation device 240 may output commands such as forward, backward, and/or stop according to a user operation.

The display device 250 may output the progress status and/or results according to operation of the controller 270 as time information. The display device 250 may display the state of charge and the charge status of the battery 220 and display information on an operating state of the personal mobility device 200 (e.g., power-on and -off state, forward, backward, stop, etc.), a traveling speed, a travelable distance, a travelable time, or the like. The display device 250 device may display an indication as to whether communication between the vehicle terminal 100 and the personal mobility device 200 is established.

The display device 250 may be implemented with at least one or more of display means such as a liquid crystal display (LCD), a thin film transistor liquid crystal display (TFT LCD), an organic light-emitting diode (OLED) display, a flexible display, a 3D display, a transparent display, a head-up display (HUD), and a touch screen.

The display device 250 may include an audio output device such as a speaker capable of outputting audio data (e.g., warning sound) stored in a memory M. In addition, the display device 130 may be implemented with a touch screen coupled with a touch sensor, and may be used as an input device as well as an output device.

The driving device 260 may control operation of a motor (not illustrated), that is, a rotational direction and/or a rotational speed, according to an instruction from the controller 270. The motor may be driven by power (drive power) supplied from the battery 220.

The controller 270 may control overall operation of the personal mobility device 200. The controller 270 includes a processor P and the memory M. The processor P may execute processing of instructions stored in the memory M. The processor P may include at least one of an application specific integrated circuit (ASIC), a digital signal processor (DSP), a programmable logic device (PLD), a field programmable gate array (FPGA), a central processing unit (CPU), a microcontroller, and microprocessors. The memory M may include at least one of storage media, such as a flash memory, a hard disk, an SD card (Secure Digital Card), a random access memory (RAM), a static random access memory (SRAM), a read only memory (ROM), a Programmable Read Only Memory (PROM), an Electrically Erasable and Programmable ROM (EEPROM), a Erasable and Programmable ROM (EPROM), and a register.

The controller 270 may turn on or off a power supply of the personal mobility device 200 by controlling the battery management device 230 according to a user input inputted through the operation device 240. The controller 270 may control the operation of the personal mobility device 200, that is, forward, backward, or stop by controlling the driving device 260 based on the user input, that is, data output from the operation device 240.

The controller 270 may connect a channel for communication between the communicator 140 of the vehicle terminal 100 and the communicator 210 when the operation of the personal mobility device 200 is started. In this case, the controller 270 may establish a communication channel by referring to settings information related to communication connection between the vehicle terminal 100 and the personal mobility device 200, settings information being stored in the memory M in advance.

The controller 270 may monitor the state of charge and/or the charge status of the battery 220 through the battery management device 230 and visually display a result of the monitoring on the display device 250.

The controller 270 may transmit information such as the state of charge and/or the charge status of the battery 220 to the vehicle terminal 100 through the communicator 210. The controller 270 may receive the travelable distance and/or travelable time information of the personal mobility device 200 calculated based on the state of charge and/or the charge status of the battery 220 from the vehicle terminal 100 through the communicator 210. The controller 270 may display the travelable distance and/or travelable time of the personal mobility device 200 on the display device 250.

Meanwhile, the controller 270 may compute the travelable distance and/or travelable time of the personal mobility device 200 according to the state of charge and/or the charge status of the battery 220. The controller 270 may provide information on the travelable distance and/or travelable time of the personal mobility device 200 to the vehicle terminal 100 through the communicator 210.

Figure 3:
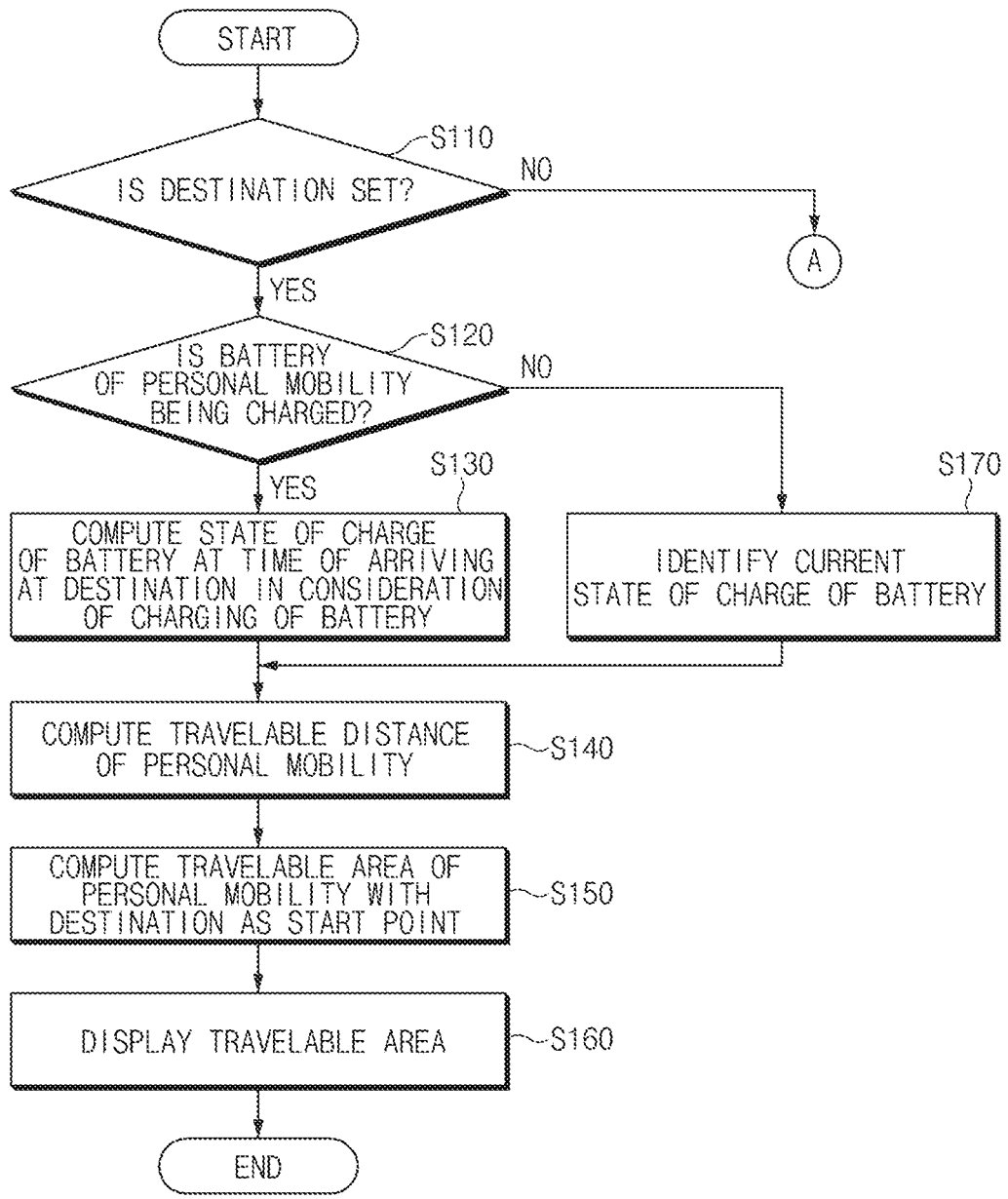
FIGS. 3 and 4 are flowcharts of a vehicle control method according to embodiments of the present disclosure.
Figure 4:
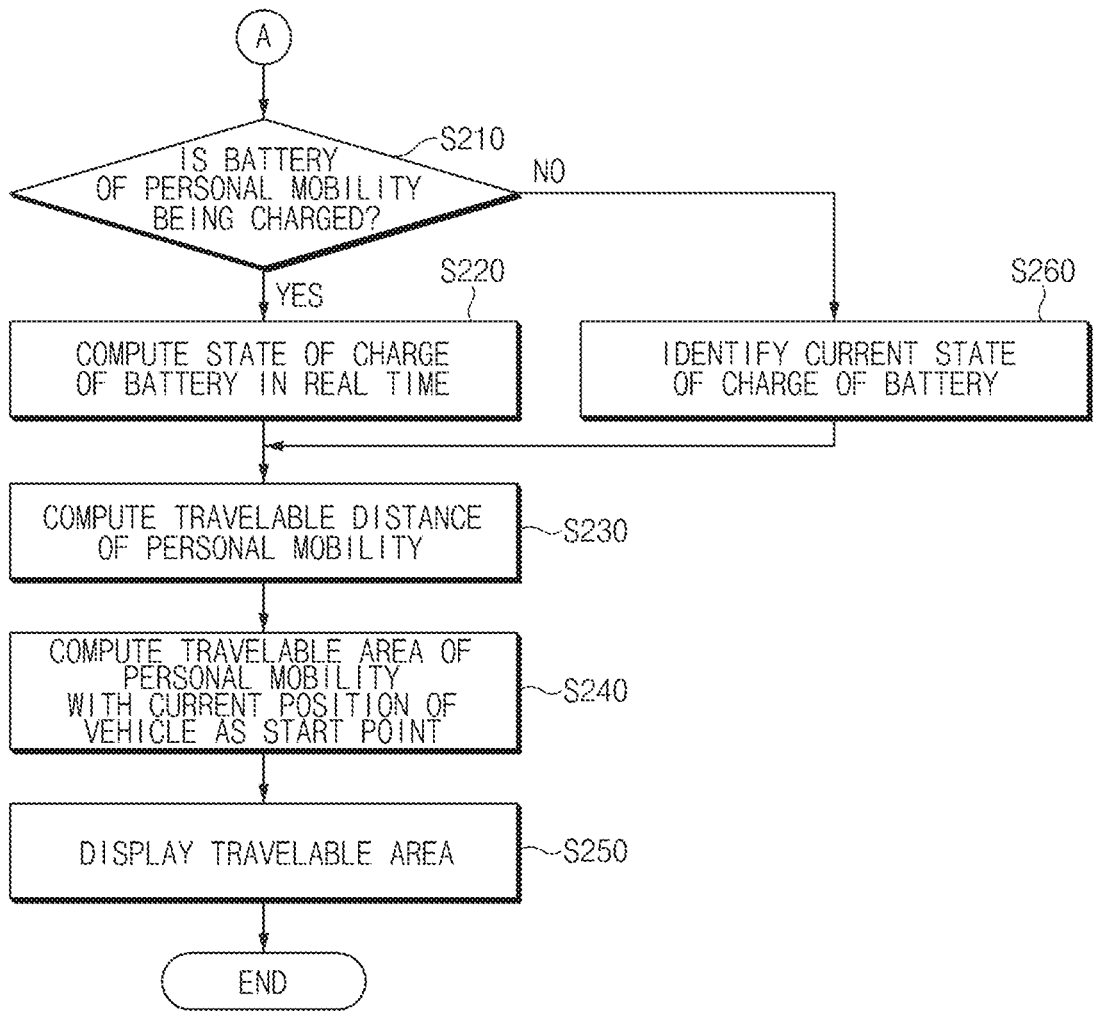

FIGS. 3 and 4 are flowcharts of a control method of a vehicle according to embodiments of the present disclosure.

The processor 170 of the vehicle terminal 100 may determine whether a destination is set (S110). The processor 170 may execute a navigation function when the vehicle is started. Thereafter, the processor 170 may determine whether a destination is set to the navigation function. The processor 170 may search for a route for reaching the destination when the destination is set.

When the destination is set, the processor 170 may determine whether the personal mobility device 200 mounted on the vehicle is being charged (S120). In other words, the processor 170 may determine whether a charge status of the battery 220 mounted on the personal mobility device 200 is a "being-charged status".

When the personal mobility device 200 is being charged, the processor 170 may estimate the state of charge of the battery at the time when the vehicle arrives at the destination in consideration of charging of the personal mobility device 200 (S130). The processor 170 may receive information on a current state of charge, a charge rate, and a charging start time of the battery 220 from the personal mobility device 200, and compute the state of charge of the battery at the time when the vehicle arrives at its destination based on the received information. In this case, the processor 170 may calculate the state of charge of the battery using a time required for the vehicle to arrive at the destination as the charge time.

The processor 170 may compute a travelable distance of the personal mobility device 200 based on the estimated state of charge of the battery (S140). The processor 170 may predict the state of charge of the battery 220 at the time when the vehicle arrives at the destination and compute a distance which the personal mobility device 200 is capable of moving, that is, the travelable distance, based on the predicted state of charge of the battery 220.

The processor 170 may compute the travelable area of the personal mobility device 200 based on the travelable distance (S150). The processor 170 may calculate a radius of the travelable area by multiplying the travelable distance by a predetermined set ratio. The processor 170 may calculate the travelable area of the personal mobility device 200 with the destination as a start point by applying the calculated radius of the travelable area.

The processor 170 may display the computed travelable area on a screen of the display device 130 (S160). The display device 130 may display the destination on the map according to an instruction from the processor 170, thereby allowing the travelable area to be displayed together, with the destination as a start point.

Meanwhile, when the personal mobility device 200 is not being charged in S120, the processor 170 may identify the current state of charge of the personal mobility device 200 (S170). When a charge status of the battery 220 of the personal mobility device 200 is not in a "being-charged status", the processor 170 may determine (estimate) the current state of charge of the battery 220 provided from the personal mobility device 200 to be a state of charge at the time when the vehicle arrives at (reaches) the destination. Thereafter, the processor 170 may compute the travelable distance of the personal mobility device 200 based on the current state of charge of the battery 220, and compute a travelable distance of the personal mobility device 200 with the destination as a start point based on the computed travelable distance (S140 and S150). The processor 170 may allow the display device 130 to visually display the travelable area (S160).

When the destination is not set in S110, the processor 170 may determine whether the personal mobility device 200 is being charged (S210). That is, the processor 170 may determine whether the charge status of the battery 220 of the personal mobility device 200 is a "being-charged status".

When the battery 220 is being charged, the processor 170 may compute the state of charge of the battery in real time (S220). In other words, when the vehicle is traveling while charging the personal mobility device 200, the processor 170 may compute the state of charge of the battery 220, in real time in consideration of the state of charge (current state of charge) before charging of the battery 220 of the personal mobility device 200 is started, a charge rate, and a charge time.

The controller 270 may compute the travelable distance of the personal mobility device 200 based on the computed state of charge of the battery 220 (S230). The controller 270 may compute the travelable distance of the personal mobility device 200 in consideration of the state of charge of the battery 220 that varies in real time.

The processor 170 may compute the travelable area of the personal mobility device 200 with the current position of the vehicle as a start point based on the computed travelable distance (S240). The processor 170 may acquire current position information of the vehicle through the position detector 150.

The processor 170 may display the computed travelable area on the screen of the display device 130 (S250). The processor 170 may display the current position of the vehicle on the map and simultaneously display the travelable area with the current position of the vehicle as a start point.

Meanwhile, when the personal mobility device 200 is not being charged in S210, the processor 170 may identify the current state of charge of the personal mobility device 200 (S260). The processor 170 may request the current state of charge information of the personal mobility device 200 through the communicator 140. The controller 270 of the personal mobility device 200 may identify the current state of charge of the battery 220 through the battery management device 230 and provide the identified state of charge information to the processor 170.

The processor 170 may compute the travelable distance of the personal mobility device 200 using the current state of charge of the battery 220 (S230). That is, when the personal mobility device 200 is not being charged, the processor 170 may calculate the travelable distance of the personal mobility device 200 based on the current state of charge of the battery 220 because there is no variation in the state of charge of the battery 220.

The processor 170 may calculate the travelable area of the personal mobility device 200 with the current position of the vehicle as a start point based on the travelable distance (S240). The processor 170 may calculate a range in which the personal mobility device 200 is capable of moving from the current position of the vehicle with the current state of charge.

The processor 170 may display the travelable area of the personal mobility device 200 on the screen of the display device 130 (S250). The processor 170 may allow the display device 130 to display the current position of the vehicle on the map data displayed on the screen of the display device 130 and to display the travelable area with the current position of the vehicle as a start point.

Figure 5:
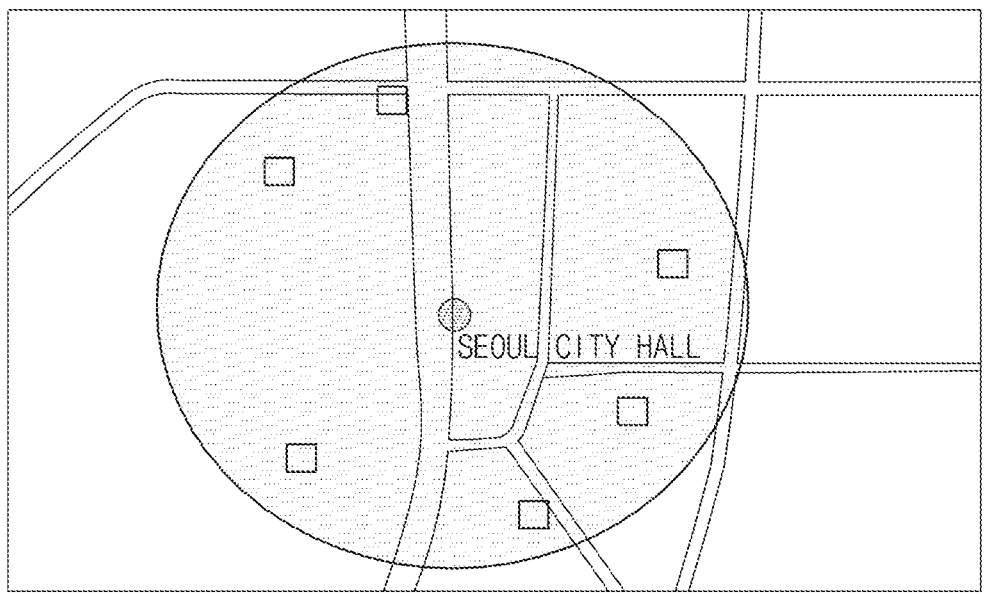
FIGS. 5 to 7 are diagrams illustrating exemplary screens displaying a travelable area of a personal mobility device according to embodiments of the present disclosure.
Figure 6:
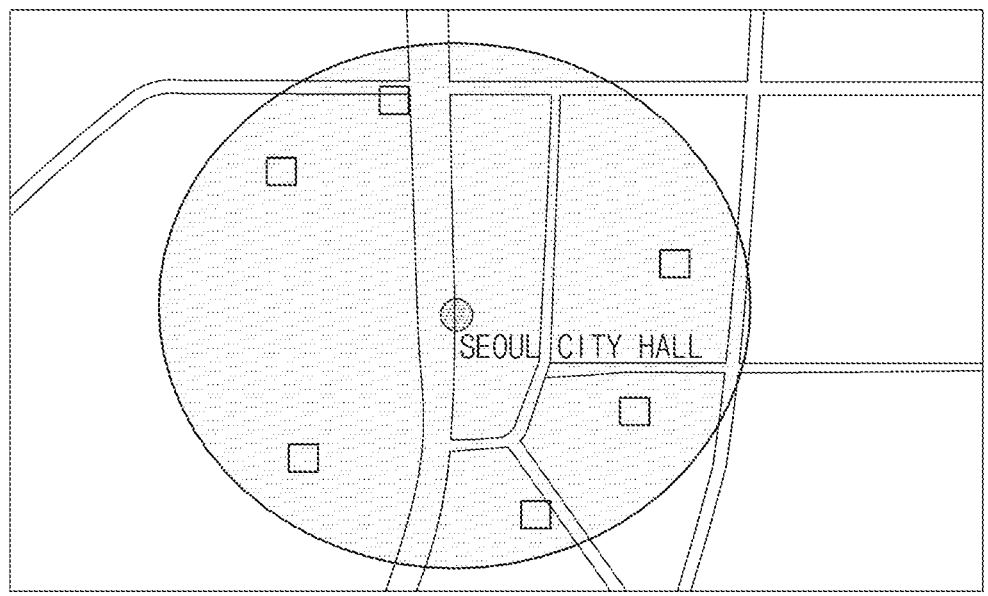
Figure 7:
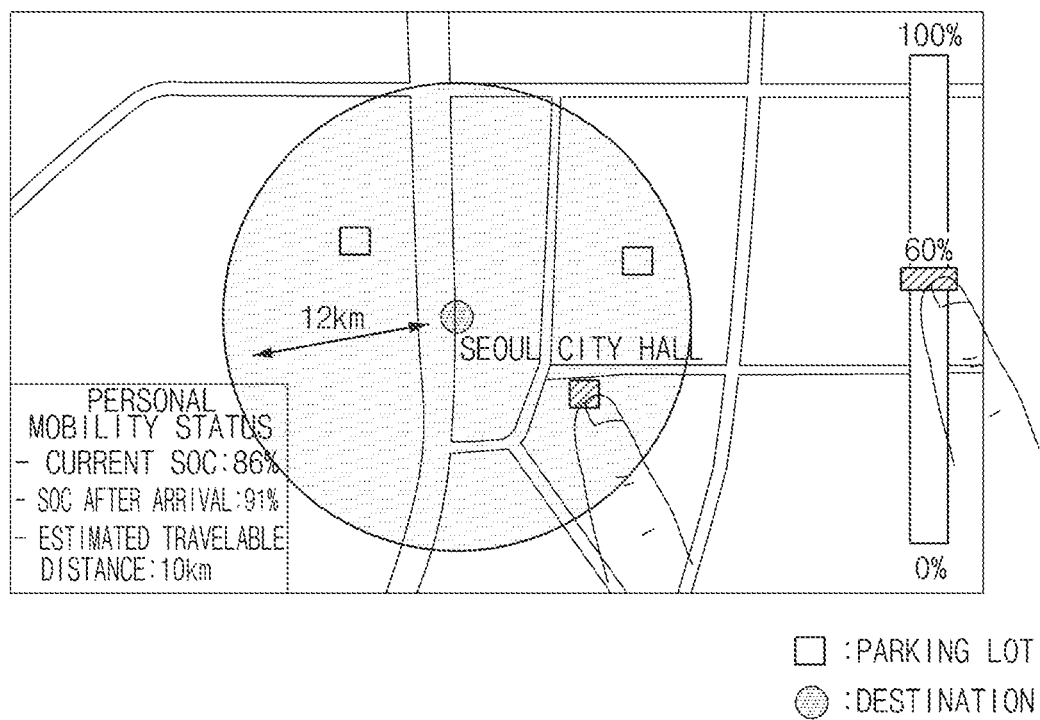

FIGS. 5 to 7 are diagrams illustrating exemplary screens displaying a travelable area of personal mobility according to embodiments of the present disclosure.

The processor 170 may estimate a state of charge of the personal mobility device 200 at the time when the vehicle arrives at a set location and calculate a travelable area of the personal mobility device 200 based on the estimated state of charge. When a destination is set, the processor 170 may display the destination that is the set location, as illustrated in FIG. 5, and display a travelable area with the destination as a start point.

On the other hand, when the destination is not set, the processor 170 may set a current position of the vehicle as a set location, and display the travelable area with the current position of the vehicle as a start point as illustrated in FIG. 6. In this case, the size of the radius of the travelable area may vary according to the current state of charge of the personal mobility device 200 calculated in real time.

In addition, the processor 170 may search for parking lots in the travelable area of the personal mobility device 200 and display the same as illustrated in FIGS. 5 and 6.

Referring to FIG. 7, the processor 170 may display status information of the personal mobility device 200. The status information of the personal mobility device 200 may include a current state of charge (SOC), a state of charge at the time of arriving at the destination, and an estimated travelable distance.

For example, when the travelable distance calculated based on the state of charge at the time of arriving at the destination, that is, the estimated travelable distance is 10 km, the processor 170 may calculate and display the radius of the travelable area of the personal mobility device 200 as 5 km corresponding to 50% of the estimated travelable distance. Thereafter, when the user adjusts a set ratio on a display screen from 50% to 60%, the processor 170 may calculate the radius of the travelable area as 6 km, which is 60% of 10 km, and reflect the radius of the calculated travelable area to display the travelable area. In this case, the maximum reciprocating distance in the travelable area (e.g., 12 km) may be displayed.

The processor 170 may search for parking lots in the travelable area and display the found parking lots on the map. When any one of the displayed parking lots is selected by the user, the processor 170 may perform route search using a corresponding parking lot as a destination. When the route search is completed, the processor 170 may perform route guidance based on any one of the found routes.

In this case, when the destination is changed to the selected parking lot, the processor 170 may re-calculate and display the travelable area of the personal mobility device 200 with the changed destination as a start point.

According to the present disclosure, it is possible to efficiently use a personal mobility device and a vehicle by predicting a state of charge (SOC) of a battery of the personal mobility device coupled with a vehicle when the vehicle arrives at a set location and displaying a range of travel for the personal mobility device. Therefore, it is possible to reduce pollution, while saving time and enhancing convenience on the user side.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle terminal comprising:
   a communicator configured to perform communication with a personal mobility device;
   a processor configured to predict a state of charge of a battery of the personal mobility device based on a charge time of the battery when the battery is being charged and to determine a travelable area of the personal mobility device based on the state of charge of the battery; and
   a display device operatively coupled to the processor, the display device configured to display the travelable area,
   wherein the charge time of the battery is calculated based on a time required for the vehicle to arrive at a set location.

2. The vehicle terminal of claim 1, wherein, when the battery is being charged, the processor is configured to compute the state of charge of the battery based on a current state of charge of the battery, and a charge rate of the battery.

3. The vehicle terminal of claim 1, wherein, when the battery is not being charged, the processor is configured to identify a current state of charge of the battery through the communicator and to determine that the current state of charge of the battery is the state of charge of the battery.

4. The vehicle terminal of claim 1, wherein the set location is defined as a preset destination or a current position of the vehicle.

5. The vehicle terminal of claim 4, wherein the processor is configured to compute a travelable distance of the personal mobility device based on the estimated state of charge of the battery and to calculate a radius of the travelable area by multiplying the travelable distance by a set ratio.

6. The vehicle terminal of claim 5, wherein, when the set location is the preset destination, the processor is configured to compute the travelable area with the preset destination as a start point based on the radius of the travelable area.

7. The vehicle terminal of claim 5, wherein, when the set location is the current position of the vehicle, the processor is configured to compute the travelable area with the current position of the vehicle as a start point based on the radius of the travelable area.

8. The vehicle terminal of claim 5, wherein the processor is configured to adjust the set ratio according to a user input.

9. The vehicle terminal of claim 1, wherein the display device is configured to display the set location on a map and the travelable area with the set location as a start point.

10. The vehicle terminal of claim 1, wherein the processor is configured to search for and identify a parking lot in the travelable area, and the display device is configured to display the identified parking lot together with the travelable area.

11. A control method of a vehicle terminal, comprising:
    determining, by a processor, whether a battery of a personal mobility device is being charged;
    predicting, by the processor, a state of charge of the battery based on a charge time of the battery when the battery is being charged;
    determining, by the processor, a travelable area of the personal mobility device based on the state of charge of the battery; and
    displaying, by a display device operatively coupled to the processor, the travelable area,
    wherein the charge time of the battery is calculated based on a time required for the vehicle to arrive at a set location.

12. The control method of claim 11, wherein the estimating of the state of charge of the battery comprises:
    when the battery is being charged, computing, by the processor, the state of charge of the battery based on a current state of charge of the battery, and a charge rate of the battery.

13. The control method of claim 11, wherein the estimating of the state of charge of the battery comprises:
    when the battery is not being charged:
       identifying, by the processor, a current state of charge of the battery through communication with the personal mobility device; and
       determining, by the processor, that the current state of charge of the battery as the state of charge of the battery.

14. The control method of claim 11, wherein the set location is defined as a preset destination or a current position of the vehicle.

15. The control method of claim 14, wherein the determining of the travelable area comprises:
    computing, by the processor, a travelable distance of the personal mobility device based on the state of charge of the battery; and
    computing, by the processor, the travelable area with the preset destination as a start point based on the travelable distance.

16. The control method of claim 14, wherein the determining of the travelable area comprises:
    computing, by the processor, a travelable distance of the personal mobility device based on the estimated state of charge of the battery; and
    computing, by the processor, the travelable area with the current position of the vehicle as a start point based on the travelable distance.

17. The vehicle terminal of claim 15, wherein the determining of the travelable area comprises:
    calculating, by the processor, a radius of the travelable area by multiplying the travelable distance by a set ratio; and
    computing, by the processor, the travelable area with the set location as a start point based on the radius of the travelable area.

18. The control method of claim 11, wherein the displaying of the travelable area comprises:
    displaying, by the display device, the set location on a map and the travelable area with the set location as a start point.

19. The control method of claim 11, further comprising:
    searching for and identifying, by the processor, a parking lot in the travelable area after the computing of the travelable area.

20. The control method of claim 19, wherein the displaying of the travelable area includes:
    displaying, by the display device, the travelable area together with the identified parking lot.

* * * * *